US005873730A

United States Patent [19]

Strong

[11] Patent Number: 5,873,730

[45] Date of Patent: Feb. 23, 1999

[54] DEVICE FOR CAREER SELECTION

[76] Inventor: Michael B. Strong, 444 San Antonio Rd., #3-B, Palo Alto, Calif. 94306

[21] Appl. No.: 876,852

[22] Filed: Jun. 16, 1997

[51] Int. Cl.[6] .............................. G09B 19/00; A45C 3/02

[52] U.S. Cl. .......................... 434/219; 150/114; 190/109; 190/902

[58] Field of Search .................................... 434/219, 107; 150/114, 112, 113, 117; 190/109, 902

[56] References Cited

U.S. PATENT DOCUMENTS

| | | | |
|---|---|---|---|
| 991,252 | 5/1911 | Trask | 150/112 |
| 1,084,101 | 1/1914 | Nover | 150/112 |
| 1,206,276 | 11/1916 | Wallach | 190/109 |
| 2,067,851 | 1/1937 | Lifton | 190/109 |
| 2,096,768 | 10/1937 | Styll | 190/902 |
| 2,529,724 | 11/1950 | Conwiser | 150/113 |
| 2,560,437 | 7/1951 | Guenther et al. | 190/902 |
| 3,716,928 | 2/1973 | Meyer . | |
| 3,818,616 | 6/1974 | Weber . | |
| 3,874,435 | 4/1975 | Allen | 190/902 |
| 3,955,609 | 5/1976 | Siegel | 150/114 |
| 4,177,909 | 12/1979 | Haskell | 150/114 |
| 4,257,463 | 3/1981 | Monaco | 150/112 |
| 4,337,048 | 6/1982 | Hatch et al. . | |
| 4,830,154 | 5/1989 | Gerch et al. | 109/109 |
| 5,217,119 | 6/1993 | Hollingsworth | 190/902 |
| 5,503,399 | 4/1996 | Honeywill . | |
| 5,547,201 | 8/1996 | Honeywill . | |

FOREIGN PATENT DOCUMENTS

| | | | |
|---|---|---|---|
| 466146 | 5/1914 | France | 190/902 |

*Primary Examiner*—Paul J. Hirsch
*Attorney, Agent, or Firm*—Chase & Yakimo, L.C.

[57] ABSTRACT

A career guidance organizer comprising a bag for storing career guidance information having an open top end and a closing flap extending from a rear wall of the bag body over the open top end to close the open end and a plurality of spaced apart dividers extending between opposite side walls of the bag to present compartments within the bag. Each divider has a different career guidance indicia thereon. Each indicia is indicative of a type of career guidance publication positioned adjacent a corresponding divider. A first indicia relates to mistakes and solutions therefor during career transitions, a second indicia relates to career sourcing options, a third indicia relates to resume preparation, and a fourth indicia relates to interview preparation and post-interview, follow-up procedures.

7 Claims, 5 Drawing Sheets

DEVICE FOR CAREER SELECTION

BACKGROUND OF THE INVENTION

People seeking employment today must be well prepared with a wide variety of information to obtain employment and meet the demand of employers. Job employment and career guidance guides may typically include informative books or games. For instance, books are available on how to find a job or write a resume. Unfortunately, these may not contain the concise information in an organized manner that is most needed to obtain employment. Games, on the other hand, may suffer from the opposite problem. That is, they may not provide enough pertinent information that is easily accessible by a job seeker and of course, also are not transportable for easy access at any time.

SUMMARY OF THE INVENTION

Accordingly, a primary object of the subject invention is to provide a career guidance organizer that includes an easily transportable bag and a plurality of spaced apart dividers therein, each divider having career guidance indicia thereon.

Another object of the subject invention is to provide a career guidance organizer for storing and providing easy access to specific, concise, substantive material needed by job seekers.

Yet another object of the subject invention is to provide a career guidance organizer that is easily portable.

Still another object of the subject invention is to provide for information relating to at least five categories: the top ten mistakes and solutions therefor made by job applicants, job searching options, resume preparation, interview preparation and post-interview follow-up procedures.

These objects are attained by providing a career guidance organizer comprising a bag for storing career guidance information having a bag body with an open top end and a closing flap extending from a rear wall of the bag body over the open top end to close the open end. A plurality of spaced apart dividers extend between opposite side walls of the bag body to present compartments within the bag body. Each divider has different career guidance indicia thereon. The indicia relates to mistakes and solutions therefor during career transitions, career sourcing options, resume preparation, and interview preparation and post-interview, follow-up procedures.

Other objects and advantages of this invention will become apparent from the following description taken in connection with the accompanying drawings, wherein is set forth by way of illustration and example, an embodiment of this invention.

DESCRIPION OF THE EMBODIMENT

Figure 1:
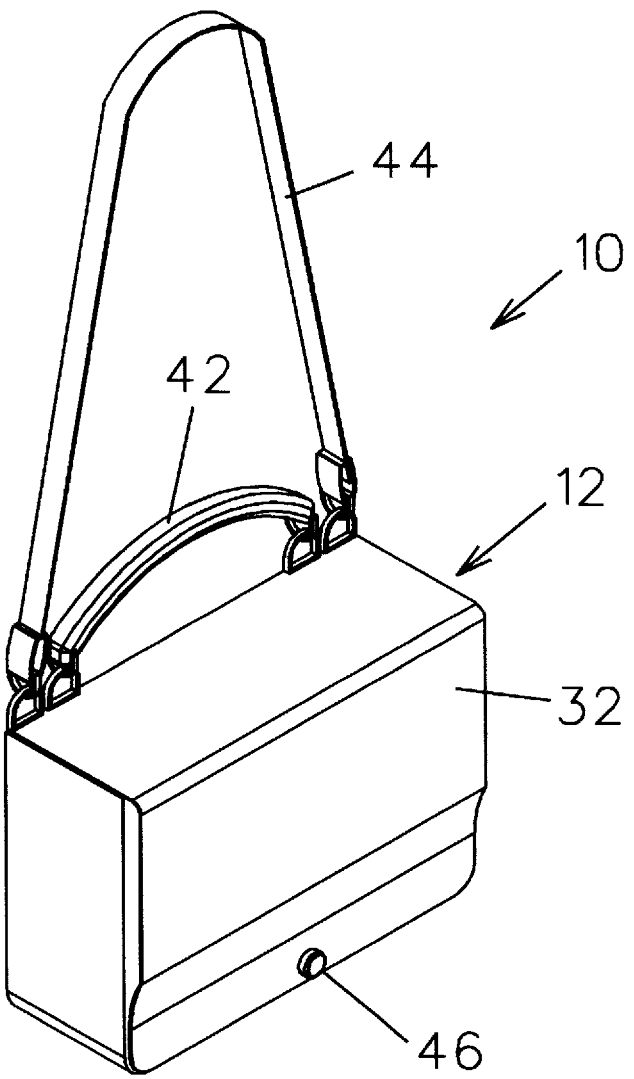
FIG. 1 is a perspective view of the career guidance organizer in accordance with the present invention.
Figure 2:
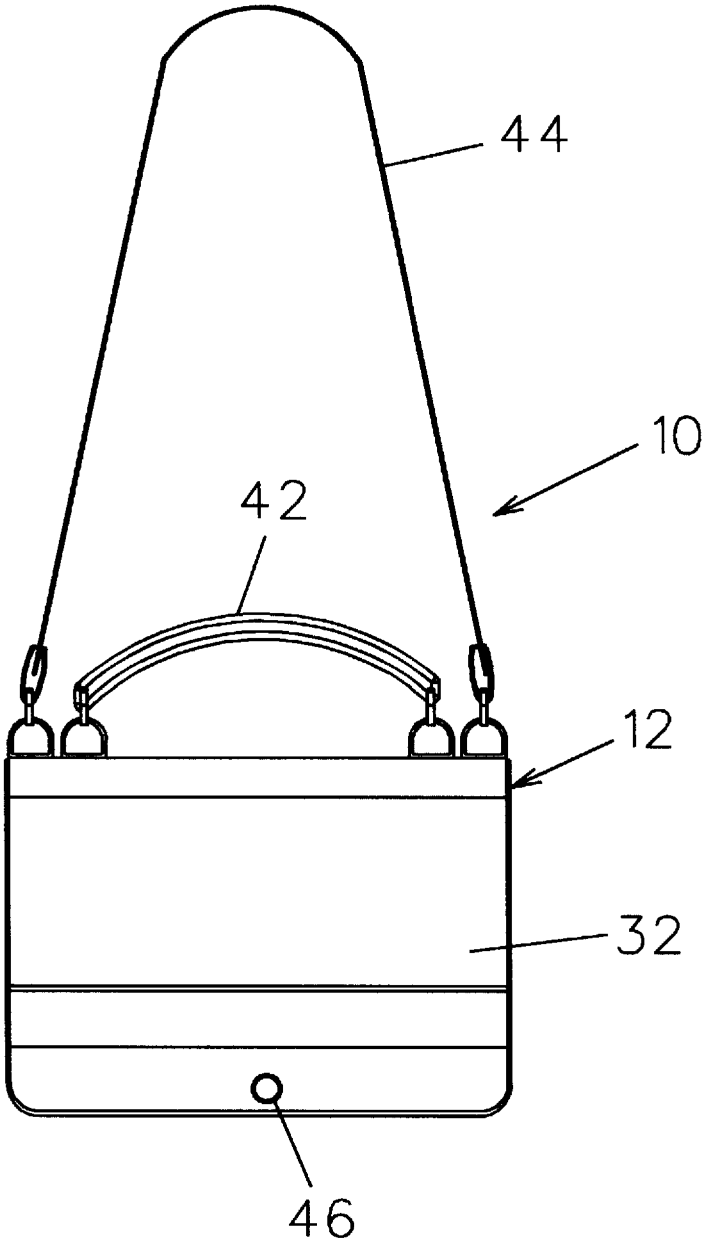
FIG. 2 is a front view of the organizer of FIG. 1.
Figure 3:
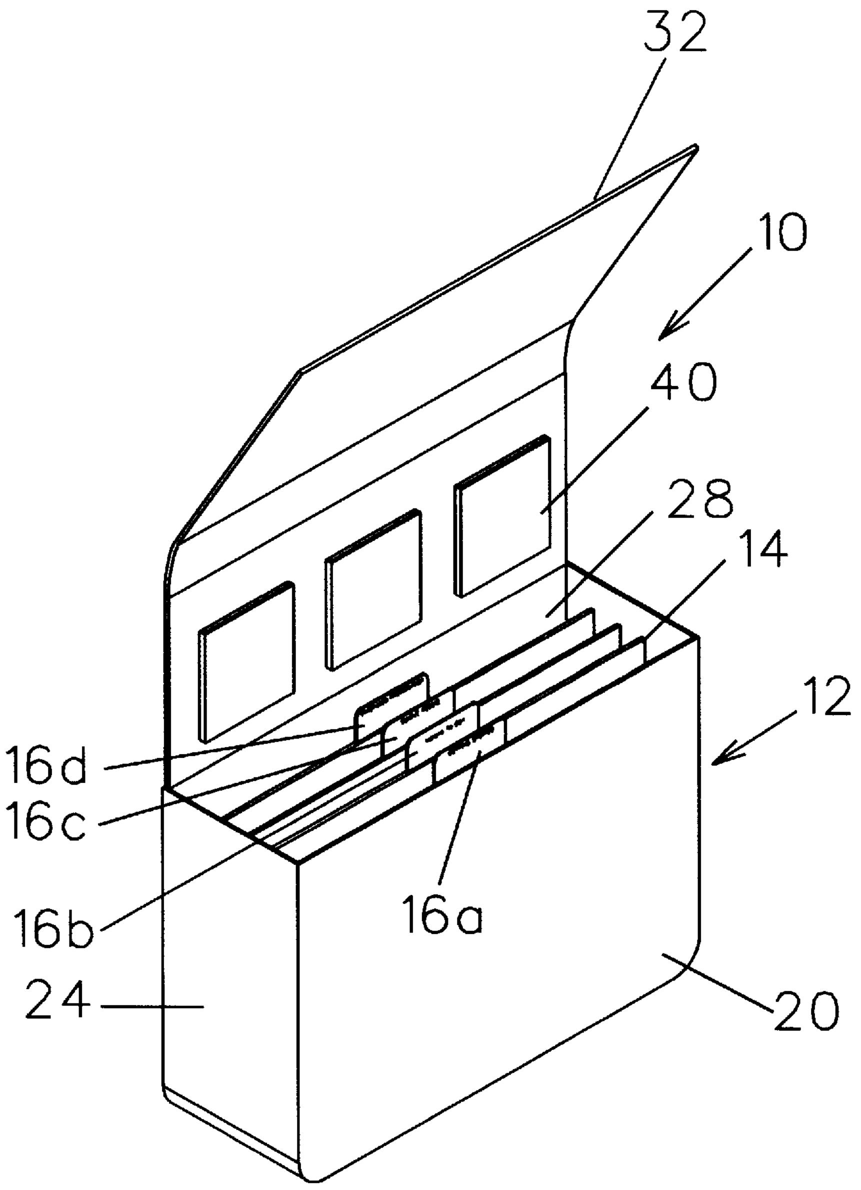
FIG. 3 is a perspective view of the organizer of FIG. 1, with the closing flap opened to show the dividers and indicia thereon.

The career guidance organizer 10, as in FIG. 1, includes bag body 12 having a plurality of dividers 14 therein to present compartments for storing and organizing career guidance information. See FIG. 3. Each divider 14 is designated by indicia 16*a–d* thereon to store the specific type of career guidance information indicated.

Figure 4:
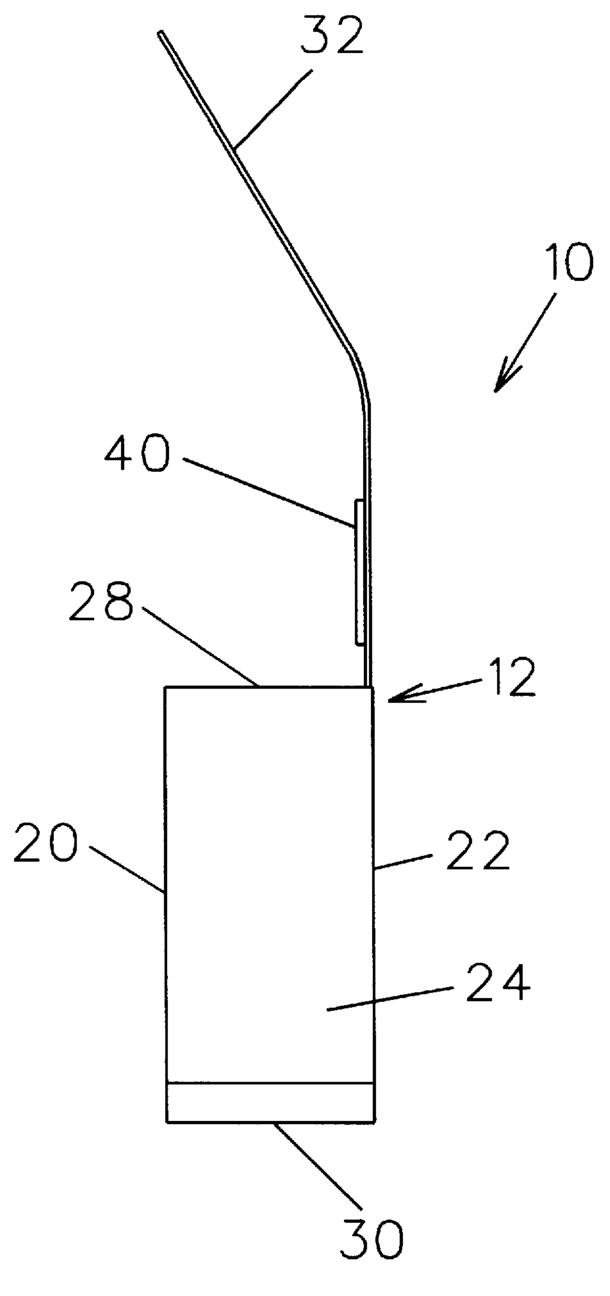
FIG. 4 is a side view of the organizer of FIG. 1 with the straps removed for clarity.

Bag body 12 includes front wall 20, rear wall 22, opposed side walls 24, open top 28 and closed bottom 30 to form bag body 12, similar to a purse or briefcase. Closing flap 32 extends from the rear wall 22 over open top 28 into engagement with front wall 20 to allow selective opening and closing of bag body 12. See FIGS. 3 and 4. Closed bottom 30 may include accordion-type folds therein to make bag body 12 expandable and increase the storage potential for additional information between dividers 14 as acquired. Bag body 12 may be any convenient size and may be formed of any attractive, light weight material, such as leather or vinyl.

Dividers 14 extend between the opposite side walls 24 of bag body 12 to present compartments within bag body 12. Dividers 14 are spaced apart and each divider 14 has career guidance indicia 16*a–d* thereon. See FIG. 3. The indicia 16*a–d* each identify different categories relating to specific areas of seeking job employment. Indicia 16*a–d* are preferably adjacent the open top 28 of bag body 12 so that they can be easily read.

Indicia 16*a* relate to the most common mistakes made by job applicants and solutions for making smooth career transitions. For instance, this indicia could read "Getting Prepared".

The second indicia 16*b* are related to career sourcing options and can include ways listed to find a job on the Internet and other employment opportunities provided through agencies as listed by city and state. Additionally, this category could include a booklet having contacts, telephone numbers and addresses of people in corporations of particular interest to the particular user. This indicia could read "Finding Work" or "Where To Go".

The third indicia 16*c* relate to resume preparation and could include formats for requisite sections of a resume. This category could include a sample "key word" resume format for use with the Internet. Also, samples and suggestions for writing a cover letter could be provided as well as tips on how to prepare a list of references. This indicia might read "Sample Resumes" or "Resume Preparation."

The fourth indicia 16*d* should relate to preparation for an interview and proper post-interview procedures. This would include the ten most frequently asked questions during an interview as well as a list of questions that cannot be asked by a prospective employer during an interview. Other tips could be provided such as the type of clothing to wear and how to appear at ease when interviewing with a potential employer. Post-interview, follow-up procedures would include a list of proper questions to ask once an offer has been given, as well as proper negotiating techniques for salary and benefits and ways of assessing a proper salary. Accordingly, this indicia could read "Interview Preparation" or "Interview Information." Of course, these last two categories, interview preparation and post-interview procedures, can be separated into two categories.

Figure 5:
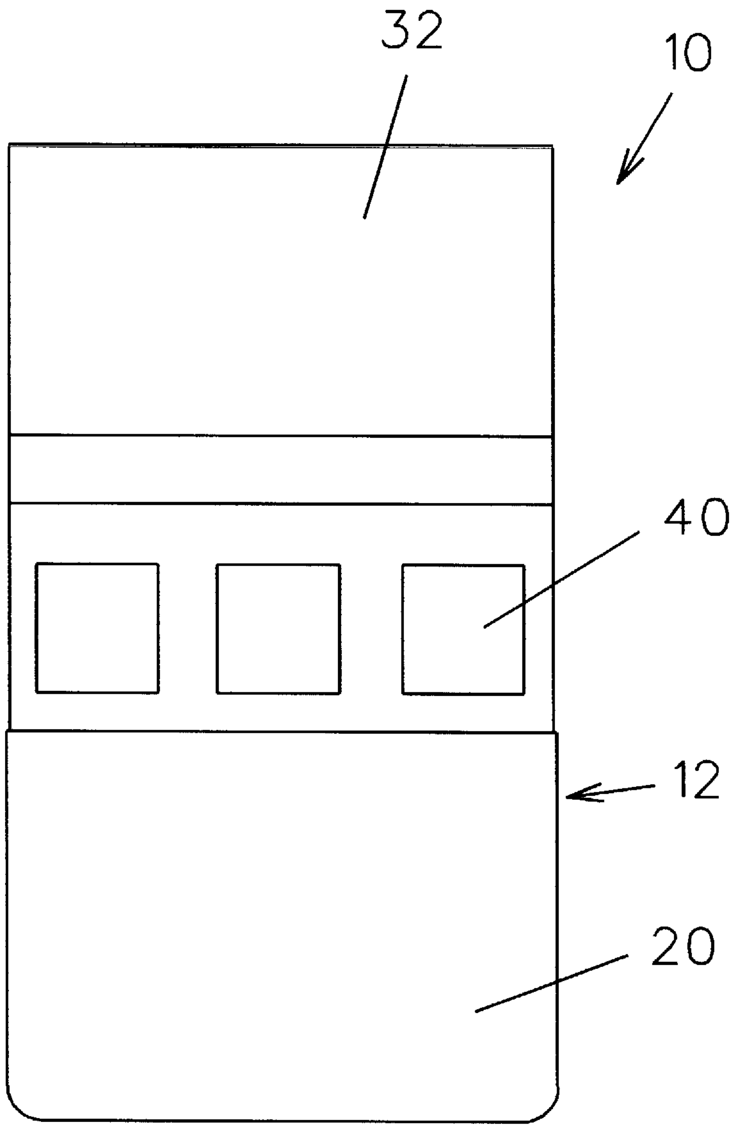
FIG. 5 is a front view of the organizer of FIG. 1 with the closing flap opened.

Additional information can be included on computer disks which are storable within bag body 12 in computer diskette holders 40. These are spaced apart along an inner surface of closing flap 32. See FIGS. 3 and 5.

To further maximize the transportability of bag body 12, carrying strap 42 and shoulder strap 44 can also be included. These straps are attached to an outer surface of closing flap 32, as seen in FIG. 1. Finally, flap fastener 46 is included to easily secure closing flap 32 to front wall 20 of bag body 12. See FIG. 1. Flap fastener 46 can be any conventional fastening member, such as a snap or zipper.

Thus, bag body 12 with dividers 14 therein having indicia 16 thereon presents an easily transportable organizer 10 that is very useful in helping job applicants obtain employment. These organizers can be personalized for different segments of the population. For instance, they may be designed for immigrants seeking Visas and Green Cards, corporations trying to obtain company sponsorships, military personnel and their spouses making a career change out of the military, or for college students trying to break into the business world.

It is to be understood that while a certain form of this invention has been illustrated and described, it is not limited thereto except insofar as such limitations are included in the following claims and allowable functional equivalents thereof.

Having thus described the invention, what is claimed as new and desired to be secured by Letters Patent is as follows:

1. An information storage system, comprising:

a bag for storing selected information, said bag having a bag body with an open top end a closed bottom end and a closing flap extending from a rear wall of said bag body and being adapted to extend over said open top end to close said open end;

a plurality of spaced apart dividers extending between opposite side walls of said bag body to present compartments within said bag body, each of said dividers having selected indicia thereon;

a plurality of publications for insertion adjacent a respective divider, each publication having said selected information therein;

said closing flap having an open top portion adapted to extend over said open top of said bag and a front portion adapted to extend over a front wall of said bag;

a plurality of computer diskette holders on an inner surface of said open top portion of said closing flap, said diskette holders having an open end adjacent said front portion of said closing flap;

each said indicia on each said divider corresponding to said selected information within said publication positioned adjacent said respective divider.

2. A system as claimed in claim 1 wherein said indicia on said plurality of dividers comprise:

a first divider indicia indicative of a first type of said selected information in an adjacent publication;

a second divider indicia indicative of a second type of said selected information in an adjacent publication;

a third divider indicia indicative of a third type of said selected information in an adjacent publication;

a fourth divider indicia indicative of a fourth type of said selected information in an adjacent publication.

3. A system as claimed in claim 2 wherein:

said first type of said selected information relates to mistakes and solutions therefor during career transitions;

said second type of said selected information relates to career sourcing options;

said third type of said selected information relates to resume preparation;

said fourth type of said selected information relates to interview preparation and post-interview, follow-up procedures.

4. A system as claimed in claim 1, further comprising:

a carrying strap attached to an outer surface of said closing flap.

5. A system as claimed in claim 4, further comprising:

a shoulder strap attached to said outer surface of said closing flap.

6. A system as claimed in claim 1, further comprising:

flap fastener means for securing a free end of said closing flap to said bag body.

7. A system as claimed in claim 1 wherein said closed end includes accordion folds to present an expandable bag body.

* * * * *